Sept. 19, 1961  R. E. FOX  3,000,647
MEANS FOR ADJUSTING LAWN MOWER WHEELS
Filed Oct. 15, 1958  2 Sheets-Sheet 1
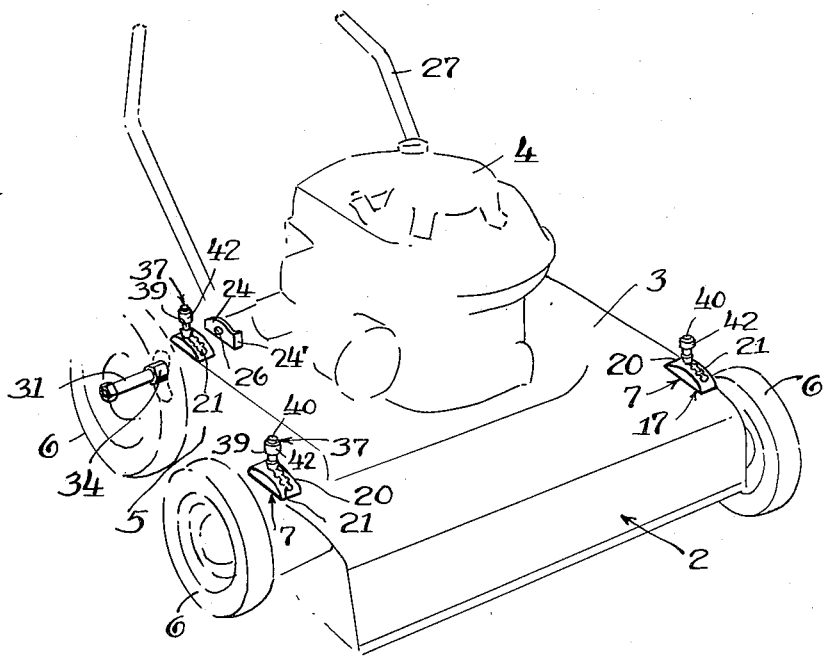
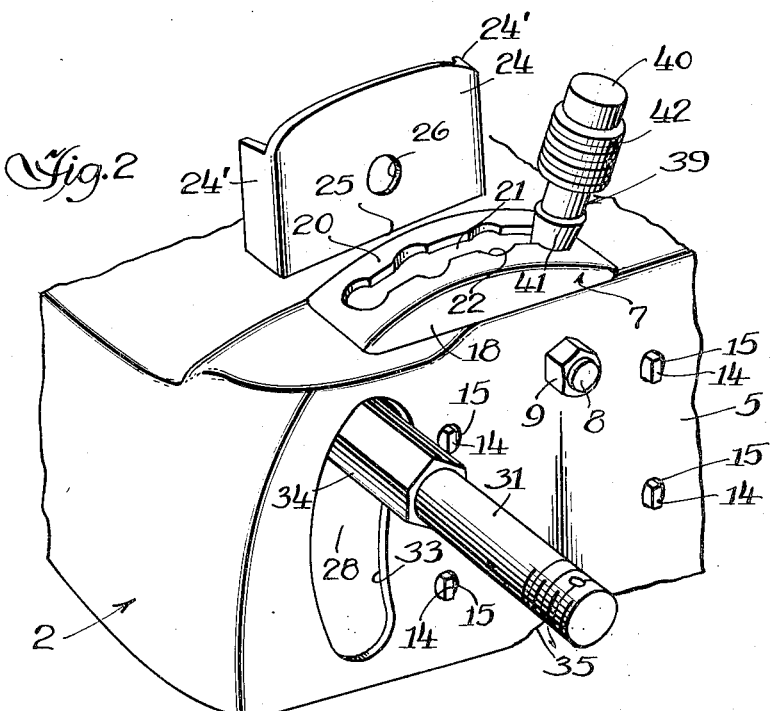
Inventor,
Richard E. Fox,
By: Schneider, Dressler, Goldsmith & Clement,
Attys.

Sept. 19, 1961   R. E. FOX   3,000,647
MEANS FOR ADJUSTING LAWN MOWER WHEELS
Filed Oct. 15, 1958   2 Sheets-Sheet 2
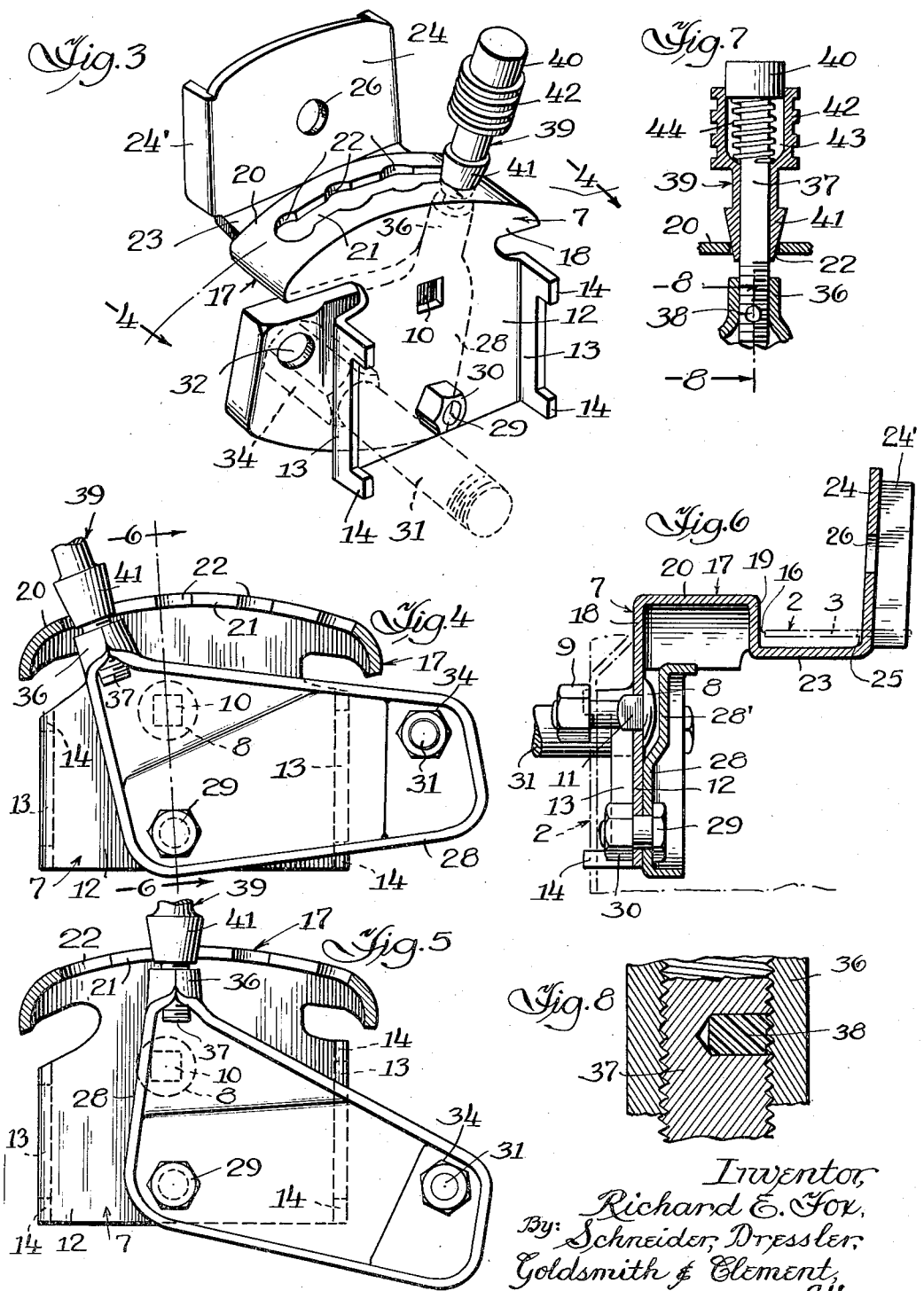
Inventor,
Richard E. Fox,
By: Schneider, Dressler,
Goldsmith & Clement,
Atty.

United States Patent Office 3,000,647
Patented Sept. 19, 1961

3,000,647
MEANS FOR ADJUSTING LAWN MOWER WHEELS
Richard E. Fox, Northbrook, Ill., assignor to Fox Howard Corporation, a corporation of Illinois
Filed Oct. 15, 1958, Ser. No. 767,356
2 Claims. (Cl. 280—43.17)

This invention relates to means for adjusting lawn mower wheels to vary the relative height between the horizontal cutting blades and the surface of the ground upon which the wheels roll.

Each wheel of the lawn mower is mounted on a short axle journalled in an aperture in a lever, preferably a bell crank, pivotally mounted on a wheel adjustment bracket which is fixed to the deck or housing of the lawn mower. At the rear end of the housing each bracket has an integral flange extending upwardly through the top of the housing, and a handle for pushing the lawn mower is pivoted to said flanges.

The bracket is slotted through its top portion, which projects above the top of the housing. One end of the lever, opposite the end on which the wheel is mounted, projects upwardly toward the slot and terminates slightly below and in alignment with said slot. The slot has four pairs of laterally extending notches forming enlargements spaced longitudinally along the slot. A sleeve mounted on a rod threaded into one end of the lever has a conical portion adapted to be held in any pair of notches along the slot to hold the wheel at a predetermined height to regulate the perpendicular distance between the plane of the bottom of the wheels and the horizontal plane of the rotatable cutting blade. A spring urges the sleeve downwardly.

The sleeve is lifted against the action of the spring to release it from the pair of notches in which it is held, and the rod and sleeve are then moved pivotally to change the wheel adjustment. The rod is moved forwardly to lower the wheel relative to the housing to increase the perpendicular distance of the blade from the plane of the bottom of the wheels, or rearwardly to decrease the distance of the blade from the ground.

Heretofore many attempts have been made to provide adjustment means to change the height of cutting blades relative to the ground in a lawn mower. For example, the housing in which the axles are mounted has been provided with a plurality of vertically spaced holes so that the axles can be removed from one set of holes and located in a different set. Such means require some sort of tool, such as a wrench or pliers, and are not satisfactory, because, in addition to the need for having a tool handy, the nuts which must be loosened before the adjustment can be made often become corroded, and it is extremely difficult to loosen them.

In accordance with the present invention a bracket is located by a plurality of integral lugs and a single nut and bolt tighten the bracket in place. A rod, provided with an enlarged head at one end and a thread at its other end, is threaded into one end of the lever which is rolled and threaded to receive the lower end of the rod. The rod is provided with a nylon stud which prevents it from shaking out of place during operation of the mower. The sleeve for holding the adjusting rod in place is urged downwardly by a spring enclosed in the upper end of the sleeve. The sleeve may be easily lifted to change the position of the adjusting rod, and upon release will immediately return to holding position to hold the wheel in the adjusted position.

Each side wall of the housing has an enclosed arcuate slot through which a rear axle extends to permit arcuate displacement of the axle when the wheel is to be adjusted. The front axles extend through similar slots in the side walls of the housing. The slots for the front axles are open at the bottom to provide a corresponding range of arcuate displacement of the front axles.

The structure by means of which the above mentioned and other advantages of the invention are attained will be described in the following specification, taken in conjunction with the accompanying drawings showing a preferred illustrative embodiment of the invention, in which:

FIGURE 1 is a fragmentary perspective view of a lawn mower, showing the means for adjusting the wheels;

FIG. 2 is an enlarged fragmentary perspective view of the housing for the wheel adjusting means, showing a short axle on which one rear wheel is mounted, and the means for adjusting its position relative to the plane of the horizontal cutting blade;

FIG. 3 is a view similar to FIG. 2, with the housing removed to clarify illustration of the wheel adjusting means;

FIG. 4 is a vertical sectional view taken along the line 4—4 of FIG. 3;

FIG. 5 is a sectional view, similar to FIG. 4, showing the lever in a different position.

FIG. 6 is a cross sectional view, taken along the line 6—6 of FIG. 4;

FIG. 7 is a detailed perspective view of the rod for operating the lever; and

FIG. 8 is a fragmentary sectional view, taken along the line 8—8 of FIG. 7.

In the drawings, the reference numeral 2 indicates the housing or deck of a lawn mower having a top wall 3 for supporting a motor 4, and side walls 5. A wheel 6 is rotatably mounted, in a manner hereinafter described, adjacent each end of each side wall. The wheel mounting is substantially the same for each wheel, and the description of one will apply to the others equally as well.

A bracket 7 is rigidly secured to the inner surface of side wall 5 by means of a bolt 8 and nut 9. The aperture 10 provided in bracket 7 for bolt 8 is shown as being square, and the portion 11 of the shank of bolt 8 which engages aperture 10 is also square. Aperture 10 may be of any desired shape, but is preferably non-circular, and portion 11 of bolt 8 is shaped to conform to the aperture. The shape of the portion 11 of bolt 8 prevents rotation of the bolt in the aperture, and thereby facilitates threading of nut 9 on the cylindrical threaded end portion of the bolt. Bracket 7 includes a vertical plate 12 having outwardly extending flanges 13 at its opposite edges. Each flange has two outwardly extending integral lugs 14 which project through apertures 15 in side walls 5 to insure proper positioning of the bracket relative to the side wall.

Housing 2 is provided with a rectangular opening 16 (FIG. 6) in top wall 3. Opening 16 is offset outwardly from the upper edge of plate 12, and bracket 7 has an offset section 17 fitting snugly in opening 16 and extending upwardly through said opening. Section 17 comprises two upright side walls 18 and 19 joined by an arcuately curved top wall 20. Top wall 20 is provided with a longitudinally extending slot 21 having a plurality of pairs of laterally extending notches 22 for a purpose hereinafter described.

In addition to the bracket structure hereinabove described, which is complete insofar as the brackets for the front wheel assemblies are concerned, the bracket for each of the rear wheel assemblies additionally includes a horizontal section 23 extending inwardly from the lower edge of side wall 19. Horizontal section 23 is positioned below top wall 3 of housing 2 and terminates at its inner end in a vertical plate 24 which extends upwardly through a U-shaped slot 25 in top wall 3. Plate 24 has a flange 24' at each edge to provide added rigidity. An aperture 26 is provided in plate 24 to receive a stud (not shown)

by means of which a handle 27 for pushing the mower may be pivotally secured.

A lever 28, preferably a bell crank, is pivotally secured to the inner surface of plate 12 of bracket 7 by means of a bolt 29 and nut 30. The upper edge portion of lever 28 is offset, as indicated at 28′, FIG. 6, to provide clearance for the head of bolt 8. Each wheel 6 is mounted on a short axle 31 having one end journalled in an aperture 32 in one end of lever 28. Axle 31 extends outwardly from lever 28 through an arcuate slot 33 in side wall 5. A spacer nut 34 is threaded on each axle 31 to provide clearance between wheel 6 and bolt 8 which projects outwardly of side wall 5. Preferably side wall 5 is curved inwardly, as indicated at 35, FIG. 2, to reduce the length of bolt 8 as much as possible.

The other end of lever 28 is rolled, as indicated at 36, and threaded to receive one end of a rod 37. Rod 37 extends upwardly through slot 21 and is provided with a nylon stud 38 (FIGS. 7 and 8) in the portion engaging the thread of portion 36 of lever 28. The nylon stud prevents rod 37 from being shaken out of position when the motor is operated. A sleeve 39 is mounted on rod 37 between arcuate top wall 20 and the head 40 of rod 37. The lower end of sleeve 39 is conical, as shown at 41, to fit snugly in any pair of notches 22 of slot 21. The upper end of sleeve 39 is enlarged, to form a knob 42, and is counterbored to provide a recess 43 having an inside diameter large enough to receive head 40. A compression spring 44 housed in recess 43 encircles the upper end of rod 37 just below its head 40. Spring 44 bears against the bottom of recess 43 and the underside of head 40 to urge sleeve 39 downwardly, and to hold its conical portion 41 in any pair of notches 22 between which rod 37 is positioned.

In order to change the wheel adjustment, sleeve 39 is lifted against the action of spring 44 by pressing down on head 40 and pulling up on knob 42 to clear conical portion 41 from the notches in which it is located. Rod 37 is then moved in slot 21, and sleeve 39 is released. Spring 44 then forces conical portion 41 of sleeve 39 into the next pair of notches 22 with which it is aligned. Each wheel 6 is adjusted separately, but all four wheels should be at the same level for efficient operation of the mower.

While I have described a preferred embodiment of the invention in considerable detail, it will be understood that the description is intended to be illustrative rather than restrictive, as many details of the structure may be modified or changed without departing from the spirit or scope of the invention. Accordingly, I do not desire to be restricted to the exact details of construction described.

I claim:

1. In a lawn mower, a housing having a top wall and a pair of side walls depending from said top wall, a plurality of wheels rotatable in planes parallel to said side walls, means for adjusting the height of said wheels relative to said housing, said means comprising a plurality of brackets rigidly secured to said housing, a bell crank pivotally secured to each of said brackets, each of said bell cranks having an aperture on one side of said pivotal connection for supporting an axle, an axle journalled in each of said apertures, each of said wheels being mounted on separate axles, means on the opposite side of said pivotal connection on each bell crank for pivotally moving said bell crank to vary the height of the axle and wheel associated with said bell crank relative to the housing, said last mentioned means including a sleeve for holding said bell crank against pivotal movement and a spring urging said sleeve into holding position.

2. In a lawn mower, a housing, a bracket secured to said housing, said bracket having a top wall provided with a longitudinal slot characterized by pairs of laterally extending notches forming enlargements spaced longitudinally of said slot, a bell crank pivotally mounted on said bracket, an axle journalled in an aperture in one end of said bell crank, a wheel mounted on said axle, the other end of said bell crank having a threaded portion terminating beneath said slot, a threaded rod extending through said slot and engaging the threaded portion of said bell crank, said rod being movable longitudinally of said slot to move said bell crank pivotally and thereby vary the height of said wheel relative to said housing, a sleeve mounted on said rod, said sleeve having a conical outer surface adapted to fit into any of said pairs of laterally extending notches, and a spring encircling one portion of said rod, said spring engaging said sleeve and urging it downwardly axially of said rod to engage said slot, whereby said rod may be retained in any of said pairs of laterally extending notches to hold said wheel against vertical displacement relative to said housing.

References Cited in the file of this patent

UNITED STATES PATENTS

| | | |
|---|---|---|
| 334,424 | Fowler | Jan. 19, 1886 |
| 2,722,432 | Robertson | Nov. 1, 1955 |
| 2,776,844 | Wilkin | Jan. 8, 1957 |
| 2,818,270 | Cataline | Dec. 31, 1957 |
| 2,836,430 | Langenbacher | May 27, 1958 |
| 2,848,859 | Avel | Aug. 26, 1958 |
| 2,862,721 | Wehner | Dec. 2, 1958 |
| 2,915,318 | Chesser | Dec. 1, 1959 |